United States Patent
Hamilton et al.

[11] Patent Number: 5,841,244
[45] Date of Patent: Nov. 24, 1998

[54] RF COIL/HEAT PIPE FOR SOLID STATE LIGHT DRIVER

[75] Inventors: Robin E. Hamilton, Millersville; Paul G. Kennedy, Grasonville; Raymond A. Smith, Severna Park, all of Md.

[73] Assignee: Northrop Grumman Corporation, Los Angeles, Calif.

[21] Appl. No.: 877,848

[22] Filed: Jun. 18, 1997

[51] Int. Cl.$^6$ .................................................. H05B 41/16
[52] U.S. Cl. ......................... 315/248; 315/112; 315/344; 165/104.26; 361/700; 174/16.2
[58] Field of Search .................................... 315/248, 112, 315/344, 267, 236, 283; 165/104.26, 46; 361/694, 696–698, 700–704; 174/15.1, 15.2, 16.2, 16.3

[56] References Cited

U.S. PATENT DOCUMENTS

| | | | |
|---|---|---|---|
| 3,517,730 | 6/1970 | Wyatt | 165/32 |
| 5,168,926 | 12/1992 | Watson et al. | 165/185 |
| 5,304,735 | 4/1994 | Earl et al. | 174/16.3 |
| 5,525,865 | 6/1996 | Simpson | 315/39 |

OTHER PUBLICATIONS

"Heat Pipes For Electronics Cooling Applications", Scott D. Garner P.E., *Electronics Cooling*, vol. 2, No. 3, Sep. 1996, pp. 18–23.

*Primary Examiner*—Robert J. Pascal
*Assistant Examiner*—Haissa Philogene
*Attorney, Agent, or Firm*—Walter G. Sutcliff

[57] ABSTRACT

An electrodeless light bulb assembly including a case or housing supporting an electrodeless light bulb as well as a convection type heat exchanger. A solid state RF driver circuit is located inside the housing and connects to an excitation coil wrapped around the light bulb. The excitation coil comprises a metal heat pipe so as to provide an efficient thermal transport mechanism for the heat generated by the coil and the heat radiated thereto from the electrodeless bulb to the heat exchanger in addition to generating an RF excitation field for the electrodeless light bulb.

20 Claims, 3 Drawing Sheets

RF COIL/HEAT PIPE FOR SOLID STATE LIGHT DRIVER

CROSS REFERENCE TO RELATED APPLICATIONS

This application is related to the following U.S. patent applications:

U.S. application Ser. No. 08/858,419 (BD-96-088), entitled, "Solid State RF Light Driver For Electrodeless Lighting", Alfred W. Morse, filed on May 19, 1997;

U.S. application Ser. No. 08/878,441 (BD-96-176), entitled "Affordable Electrodeless Lighting", Robin E. Hamilton et al, filed on Jun. 18, 1997;

U.S. application Ser. No. 08/681,207 (WE58,813), entitled "Microchannel Cooling High Power Semiconductor Devices", Robin E. Hamilton et al, filed on Jul. 22, 1996; and U.S. application Ser. No. 08/681,344 (WE58,811), entitled "Closed Loop Liquid Cooling Within RF Modules", Robin E. Hamilton et al, filed on Jul. 22, 1996.

These applications are assigned to the assignee of the present invention and are meant to be incorporated herein by reference.

BACKGROUND OF THE INVENTION

Field of the Invention

This invention relates generally to high intensity light generation and more particularly to a system including apparatus for the excitation of an electrodeless light bulb.

Description of Related Art

There has been a long term need for improved light sources for both commercial and industrial use. The key parameters sought are efficiency, light quality, reliability and low cost. Various light sources have been developed in the past, which addresses various aspects of these needs. To date, however, no light source has been found to be optimum in all respects, and therefore a relatively large commercial market awaits new techniques which offer significant improvements.

One such light source comprises an RF excited electrodeless light bulb which comprises a closed transparent glass sphere filled with a proprietary gas. Typically, the bulb contains an inert gas, such as argon, and an element from Group VI-A of the Periodic Table of elements, such as sulfur. When the gas is excited by a high RF field, it glows with an intense white light. The efficiency of light output per unit input power is considerably higher than other types of light sources and the quality of the light is unsurpassed for its similarity to bright sunlight. Because the bulb is hermetic with no electrodes, its cost is trivial and its reliability and useful life are exceptional.

Currently, a thousand watt electrodeless bulb manufactured by Fusion Lighting, Inc. is driven at an RF frequency, for example 2.45 GHz, using magnetrons developed for microwave ovens. Magnetrons, while being relatively low in cost, have a much lower life expectancy, typically 4000 hours, than the bulb itself. While this operational life is acceptable for intermittent food preparation, it is not acceptable for lighting applications.

Another known method of exciting these types of electrodeless light bulbs is by means of an electrical coil which is wound around the outside of the light bulb so as to generate an RF excitation field. The coil is coupled to a driver which includes a source of RF energy, typically an RF oscillator, some type of power amplifier and a matching network. The opposite end of the excitation coil is connected back to RF ground.

The coil needs to be as small in size as possible to minimize blockage of the light emitted from the bulb. The selection of the coil material is also crucial. The coil should be highly conductive electrically for minimal $I^2R$ losses. The coil must also be made from material, such as copper, that is highly conductive thermally, due to the fact that the surface of the electrodeless bulb, which is in close proximity to the coil, will be in the order of 500° C. to 800° C. In combination with the circuit losses on the coil, the waste heat needed to be transferred from the coil is estimated to be as high as 30 watts. If this heat is not removed effectively, then the temperature of the coil rises with an associated increase in electrical resistance, which impairs the efficiency of the lighting system. Accordingly, the coil can heat up to very high temperatures yielding undesirable electrical losses and a safety hazard for commercial RF lighting applications.

In order to dissipate this relatively large concentration of heat, efforts have also been focused on the design of an excitation coil having a cross section which enhances natural convection of heat generated by the electrodeless bulb from the coil to the air. One known sample consists in the utilization of large propeller type fins welded around the perimeter of the coil. While these fins provide some improvement, the overall result is a bulky unit that significantly blocks light emanating from the light source. While the addition of a fan for forced convection cooling has been suggested, such an approach is undesirable inasmuch as it adds unwanted costs, complexity in noise, while at the same time reducing system reliability. Accordingly, what is needed is an innovative electrical coil design for solid state RF lighting applications involving electrodeless bulbs.

Additionally, solid state RF circuits are currently being developed for driving electrodeless bulbs and include, for example, silicon, gallium arsenide and silicon carbide semiconductor devices. Also, the design options vary in drive levels, frequency voltage, currents, etc.

SUMMARY

Accordingly, it is an object of the present invention to provide an improvement in electrodeless lighting systems.

It is another object of the invention to provide an improvement in the excitation apparatus used to drive an electrodeless light bulb.

It is a further object of the invention to provide an improvement in an RF coil used to excite an electrodeless light bulb.

It is yet a further object of the invention to provide an improvement in the means utilized for cooling the RF coil used to excite an electrodeless light bulb.

The foregoing and other objects are achieved by an electrodeless light bulb assembly comprising a case or housing supporting an electrodeless light bulb as well as a convection type heat exchanger. A solid state light driver circuit is located inside the housing and connects to an RF excitation coil wrapped around the light bulb. The coil comprises a metal heat pipe so as to provide an efficient transport mechanism for the heat generated along the length of RF excitation coil and radiated from the light bulb to a heat exchanger in addition to generating an RF excitation field for the electrodeless bulb. The heat pipe is made from cylindrical copper tubing, the internal walls of which are lined with a capillary structure or wick, and is evacuated and charged with a working fluid, such as water or methanol. As heat is generated by the electrodeless bulb, the liquid in the RF coil/heatpipe in the vicinity of the bulb is vaporized, creating a pressure gradient which forces the vapor to flow along the inside cavity of the pipe to a cooler heat end where it condenses, giving up its latent heat of vaporization. The condensate is then returned to the region around the electrodeless bulb by capillary forces in the wick.

Further scope of applicability of the present invention will become apparent from the detailed description provided hereinafter. It should be understood, however, that the detailed description and specific example, while indicating the preferred embodiment of the invention, is given by way of illustration only, since various changes and modifications coming within the spirit and scope of the invention will become apparent to those skilled in the art from a reading of the detailed description.

BRIEF DESCRIPTION OF THE DRAWINGS

The present invention will become more fully understood when considered together with the accompanying drawings which are provided by way of illustration only, and thus are not limitative of the invention, and wherein.

DETAILED DESCRIPTION OF THE INVENTION

Figure 1:
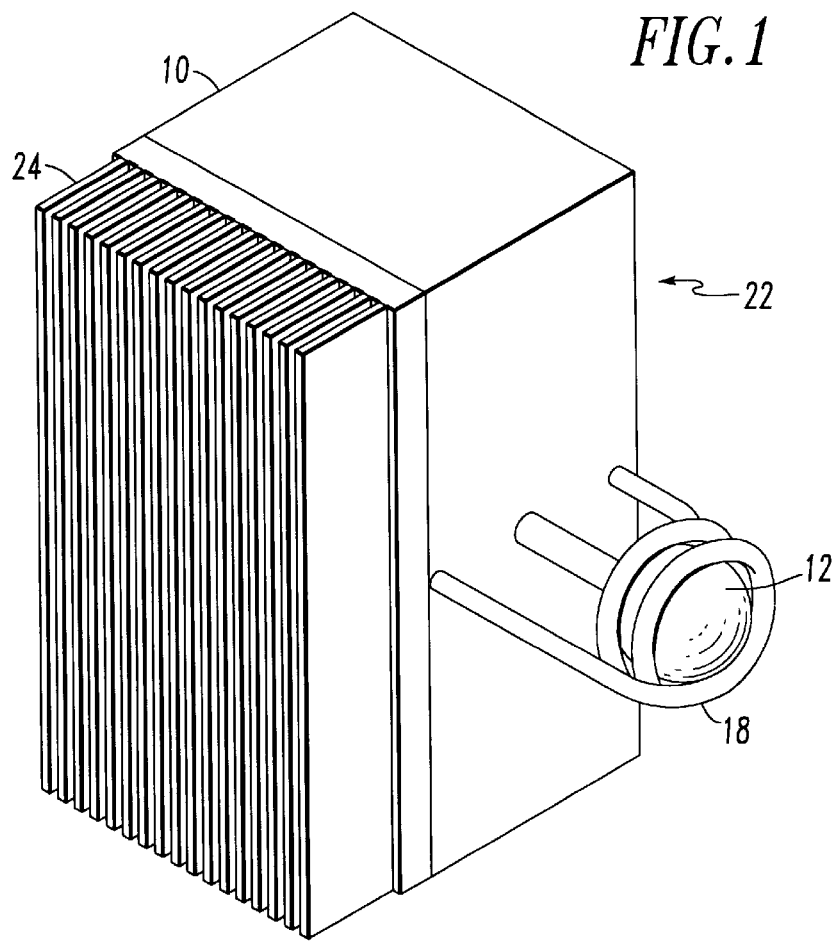
FIG. 1 is a perspective view generally illustrative of the preferred embodiment of the invention.

Referring now to the drawings wherein like reference numerals refer to like parts throughout, reference numeral 10 in FIG. 1, for example, denotes a plastic case or housing for supporting an electrodeless lamp assembly including an electrodeless light bulb 12. The light bulb 12 comprises a relatively small transparent sphere, typically having a diameter of about 23 mm. filled with an inert gas, typically argon, and containing an element selected from Group VI-A of the Periodic Table, such as sulfur, which when excited by an RF field, emits a high intensity white light akin to sun light. As noted above, such a light bulb is well known to those skilled in the art of electrodeless light technology.

Figure 2:
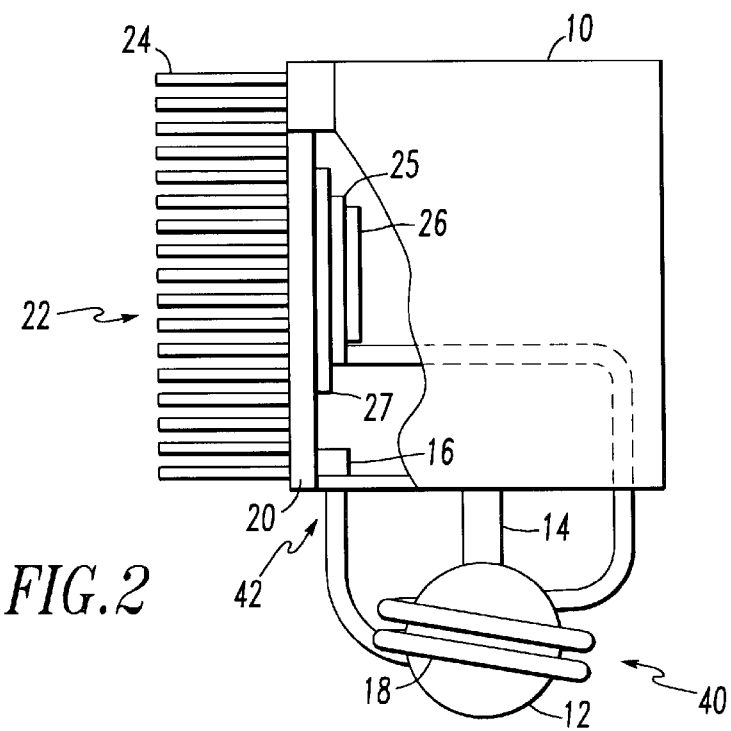
FIG. 2 is a partially cut away side elevational view further illustrative of the embodiment shown in FIG. 1.

The electrodeless bulb 12 is further shown in FIG. 2 fixedly mounted in stand-off relationship with the housing 10 where it is located on the end of a relatively small diameter post 14. In some applications, it may be desirable to rotate the bulb 12 in which case it would then be mounted on the end of a motor driven shaft.

A multiturn, typically two turn, RF excitation coil 18 is shown in FIG. 2 encircling the bulb 12 and terminating at one end 16 in a base member 20 of a finned heat exchanger 22, including a plurality of outwardly extending fin members 24. The base member 20 also acts an electrical ground plane for a solid state RF driver circuit 26 located in the housing 10.

Figure 3:
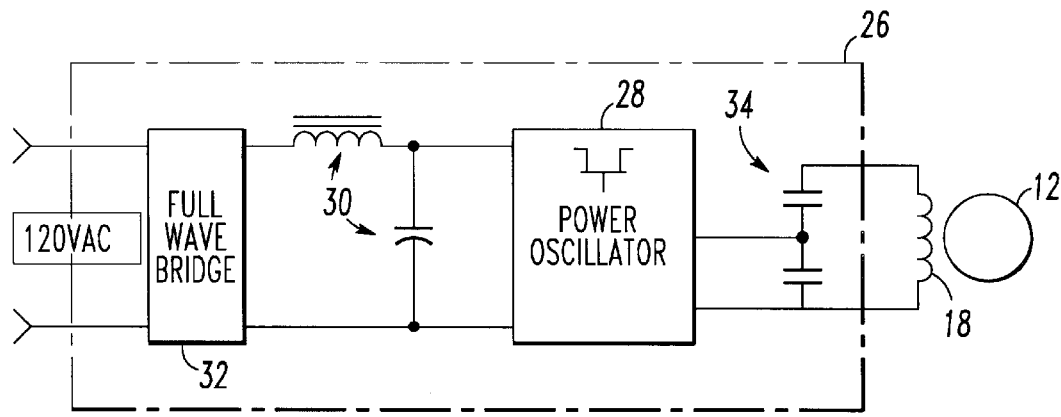
FIG. 3 is an electrical block diagram generally illustrative of a conventional RF electrodeless light driver assembly.

The driver circuit 26 generates the RF energy necessary for exciting the electrodeless bulb 12. A conventional driver unit 26 includes a signal source, typically an oscillator, and a power amplifier. Another embodiment of a driver unit is disclosed in the above cross-referenced related application U.S. application Ser. No. 08/858,419 (BD-96-088) entitled "Solid State RF Light Driver For Electrodeless Lighting" and as shown in FIG. 3, comprises a transformerless power oscillator 28 powered via a filter network 30 from a full wave bridge 32 coupled to the AC line voltage. An RF excitation signal in the region of 25 MHz is applied to the excitation coil 18 by means of an impedance matching network 34.

Figure 4:
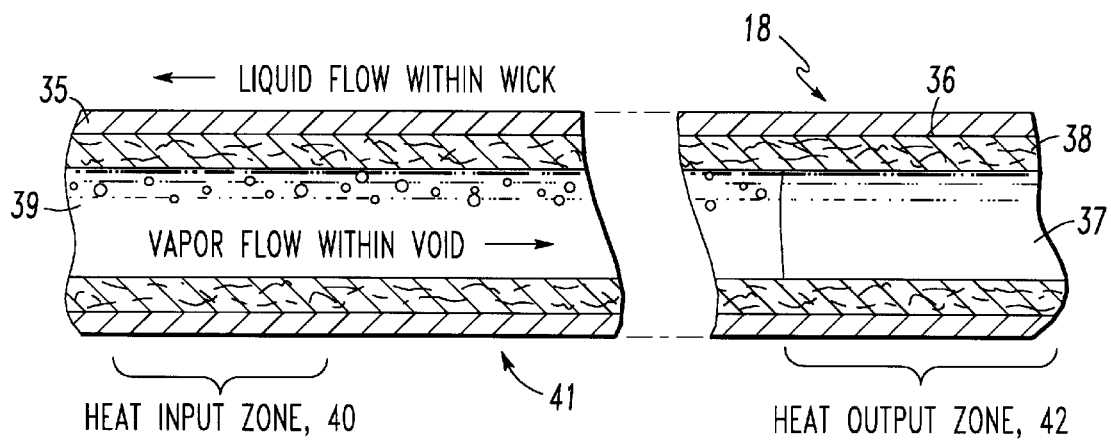
FIG. 4 is a partial longitudinal cross sectional view of a typical heat pipe.

When excited, the surface of the electrodeless bulb 12 will heat up to a temperature in the range of 500° C.–800° C. In the present invention, the excitation coil 18 not only acts as the means by which an RF field is generated and applied to the bulb 12, it also is designed to effectively remove the heat from the coil 18, the RF driver circuit 26, and the added radiated heat of the bulb 12 and transfer it to the heat exchanger 22. In this invention, the RF coil 18 comprises a heat pipe and consists of a tubular structure such as shown in FIG. 4, including a length of metal tubing 35, typically copper, the internal wall 36 of which is lined with a capillary structure 38, such as a wick. Heat pipes, in their broadest aspects, are well known and have been available since the mid 1960s. The heat pipe 18 is evacuated and then charged with a working fluid 37, i.e. a liquid such as water, prior to being sealed at an internal pressure set to the vapor pressure of the liquid. The coil shape is implemented simply by bending the sealed heat pipe 18 around a mandrel, not shown.

In operation, an evaporator section or heat input zone 40 is located at a certain distance from a condenser section or output zone 42. Heat entering the heat input zone 40 causes the working fluid 37 to vaporize. The water vapor 39 creates a pressure gradient which forces the vapor towards the heat output zone 42. The space between the heat input zone 40 and the heat output zone 42 comprises an adiabatic section 41 where the pressure drop is low and where there is relatively little temperature change. Heat is discharged from the heat pipe 18 at the condenser section 42 which is located at the heat exchanger 22 by being connected to the base/ground plane member 20 at 16 where the liquid condenses and releases its latent heat of vaporization. The condensed liquid 37 is drawn back into the pores of the wick 38 for return to the evaporator section 40. The wick 38 serves as a pump using capillary pressure to return the fluid from the condenser to the evaporator. The wick 38 also acts as an extended surface to allow higher heat fluxes. While water comprises an acceptable working liquid 37 for most applications, an alternative coolant such as methanol may be used if the application requires operation below 0° C.

In the present application, the finned heat exchanger 22 is also used for dissipating heat generated by the power amplification devices in the driver unit 26. Such apparatus is shown in FIGS. 5–8, now to be described.

Figure 5:
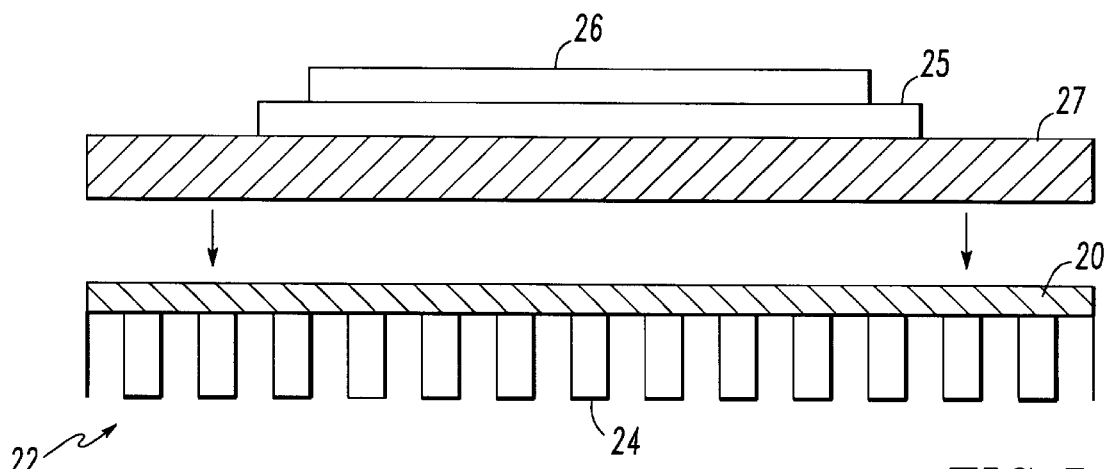
FIG. 5 is a diagram generally illustrative of one cooling arrangement for cooling a solid state RF amplifier used in connection with the embodiment shown in FIG. 2.

As shown in FIG. 5, the driver circuit 26 is supported by a substrate 25 which may be, for example, either dielectric or semiconductor material, and which is further positioned on a metal flange member 27 which is secured to the base member 20 of the heat exchanger 22, which, as noted above, also acts as an electrical ground plane.

Figure 6:
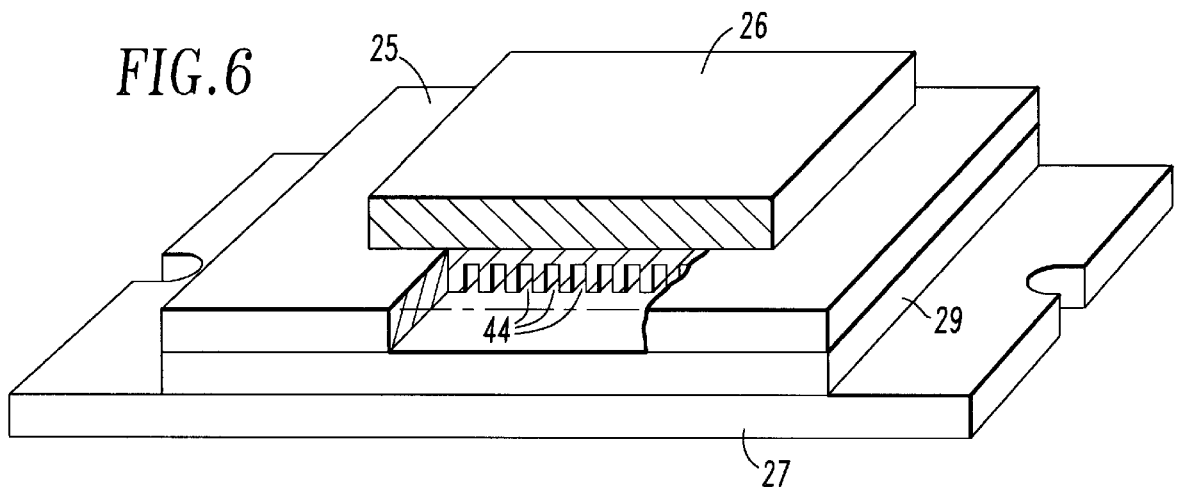
FIG. 6 is a perspective view generally illustrative of a microchannel cooling arrangement for an RF solid state amplifier used in connection with the subject invention.
Figure 7:
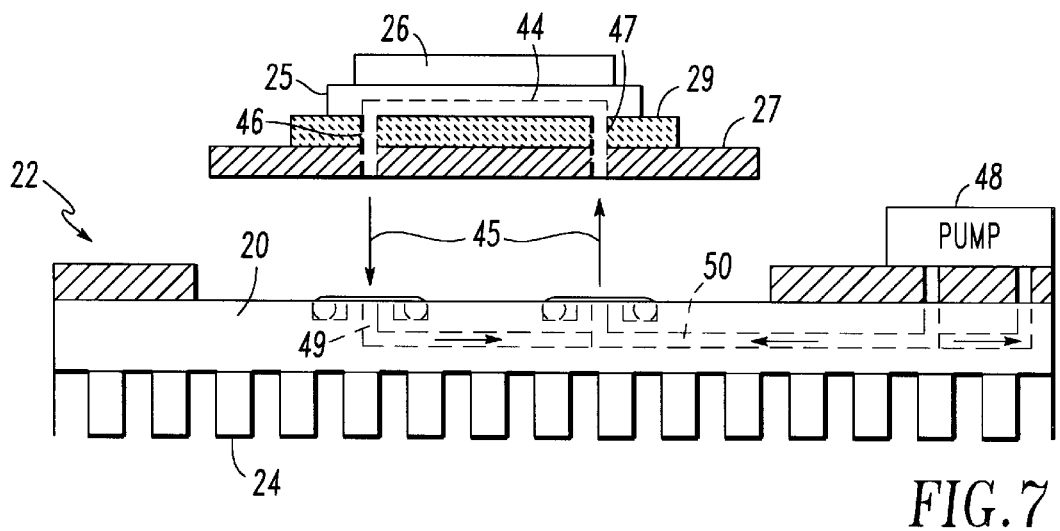
FIG. 7 is a diagram generally illustrative of a closed loop microchannel cooling arrangement for a solid state RF amplifier used in connection with the subject invention.
Figure 8:
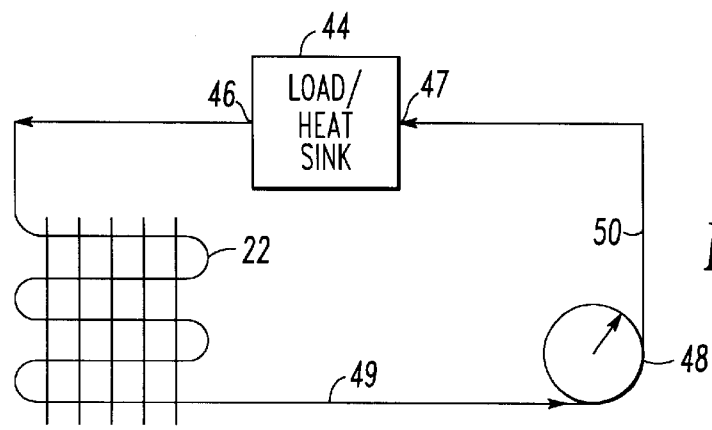
FIG. 8 is a schematic diagram illustrative of a closed loop cooling system implemented in the structure shown in FIG. 7.

In the above referenced related application Ser. Nos. 08/681,207 and 08/641,344, there is disclosed the concept of microchannel cooling of high powered semiconductor devices such as silicon carbide transistors. This concept can also be applied to the subject invention. Accordingly, as shown in FIG. 6, the substrate 25 for the driver 26 which includes a plurality of heat generating semiconductors, not shown, now includes a heat sink comprising a plurality of mutually parallel microchannels 44, which act as conduits for a cooling fluid 45 shown in FIG. 7 and which may be, for example, water flowing therethrough between coolant manifolds, not shown, located at either end of the microchannels. A closure member 29 is now located between the substrate 25 and the mounting flange 27, which as before, is placed in contact with the base member/ground plane 20 of the heat exchanger 22 (FIG. 5). Coolant inlet and outlet ports 46 and 47 are also formed in the closure member 29 so that liquid coolant 45 can be supplied from and returned to a source, such as a pump 48, via conduits 49 and 50 formed in the base member 20 of the heat exchanger 22. The configuration of FIG. 7 comprises a closed loop system shown schematically in FIG. 8 which enhances conduction of heat away from the semiconductor devices contained in the driver unit 26.

Thus what has been shown and described is a simple, low cost cooling system for a high intensity lighting system wherein a length of heat pipe is formed into an RF coil for a solid state driver which excites an electrodeless light bulb. Such a system is particularly useful for commercial applications requiring a source of substantially white light. The exceptional heat transport properties of the heat pipe can reliably remove up to 30 watts of heat from the light bulb with minimal gradient across the coil surface thereby achieving a desired electrical performance while at the same time maintaining commercially acceptable operating temperatures.

Having thus shown and described what is at present considered to be the preferred embodiment of the invention, it should be noted that the same has been made by way of illustration and not limitation. Accordingly, all modifications, alterations and changes coming within the spirit and scope of the invention as set forth in the appended claims are herein meant to be included.

We claim:

1. Apparatus for exciting a high intensity electrodeless light bulb, comprising:
   a housing on which an electrodeless light bulb is mounted and including a heat exchanger;
   a driver circuit for exciting the said light bulb and including an excitation coil having relatively high heat conducting properties wrapped around said light bulb and extending to and terminating at said heat exchanger, said coil being operable not only to generate a magnetic excitation field for said light bulb, but also to transfer heat generated along the length of said coil and heat radiated from said light bulb to said heat exchanger.

2. Apparatus in accordance with claim 1 wherein said excitation coil comprises a heat pipe having a heat input zone located along the length of said coil and a heat output zone located at said heat exchanger.

3. Apparatus in accordance with claim 2 wherein said heat pipe includes a length of metal tubing having an inner wall surface including wicking material in contact with a working fluid.

4. Apparatus in accordance with claim 3 wherein said working fluid comprises a volume of liquid which is vaporizable by the heat generated by said coil and said light bulb.

5. Apparatus in accordance with claim 2 wherein said heat exchanger includes a base member secured to a side of said housing and a set of heat dissipating elements extending therefrom.

6. Apparatus in accordance with claim 5 wherein said set of said heat dissipating elements comprises a set of fins.

7. Apparatus in accordance with claim 6 wherein said set of fins are cooled by natural convection.

8. Apparatus in accordance with claim 2 wherein heat generated in said driver circuit is also dissipated by said heat exchanger.

9. Apparatus in accordance with claim 2 wherein said driver circuit is thermally coupled to said heat exchanger.

10. Apparatus in accordance with claim 5 wherein said driver circuit includes a substrate with solid state circuit elements thereon and wherein said substrate is thermally coupled to said base member.

11. Apparatus in accordance with claim 10 wherein said substrate includes a plurality of passages for the flow of a coolant therethrough.

12. Apparatus in accordance with claim 11 and additionally including means for circulating the coolant through said passages.

13. Apparatus in accordance with claim 12 wherein said passages are connected to a source of coolant in a closed circulating loop.

14. Apparatus in accordance with claim 13 wherein said circulating loop includes a pump.

15. Apparatus in accordance with claim 11 wherein said passages comprise a set of microchannels formed in the bottom of said substrate.

16. Apparatus in accordance with claim 15 wherein said set of microchannels comprises a plurality of mutually parallel microchannels.

17. Apparatus in accordance with claim 2 wherein said electrodeless light bulb is generally spherical in shape.

18. Apparatus in accordance with claim 17 wherein said electrodeless light bulb is mounted in stand-off relationship with housing.

19. Apparatus in accordance with claim 18 wherein said light bulb is secured to one end of a post whose other end is secured to one wall of said housing.

20. Apparatus in accordance with claim 17 wherein said light bulb is filled with a gaseous mixture which emits substantially white light when excited by an RF field.

* * * * *